Jan. 27, 1970   R. E. FAYLING   3,492,532
OVERVOLTAGE PROTECTION DEVICE
Filed Nov. 17, 1967
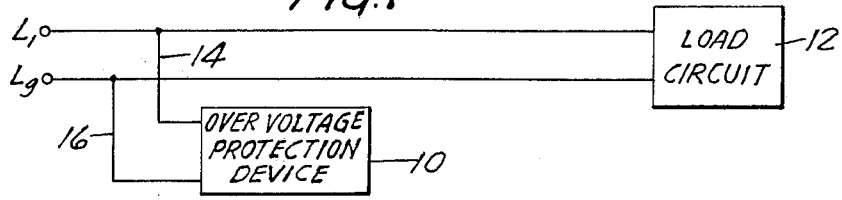
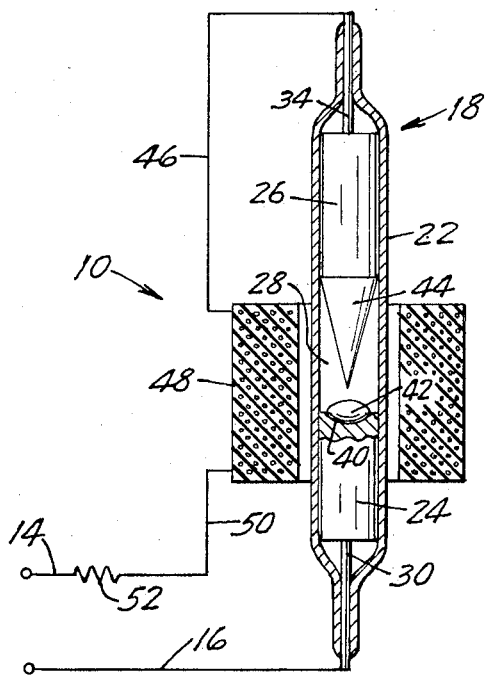
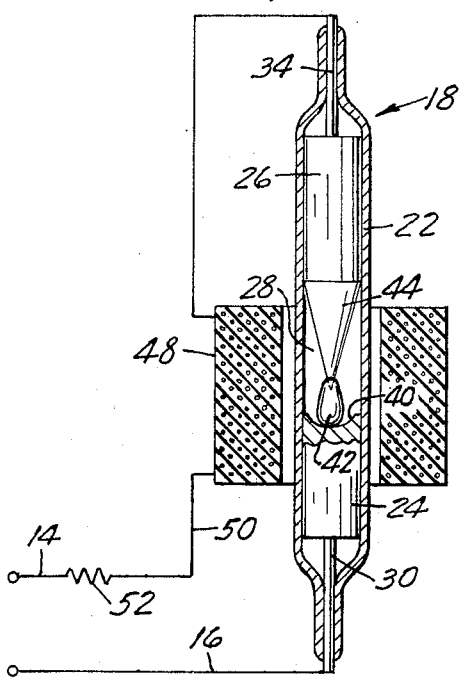
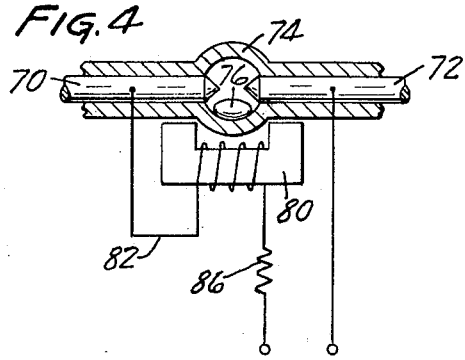
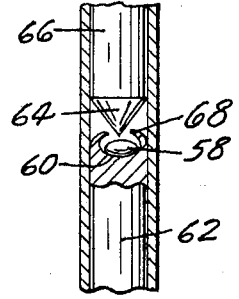
INVENTOR.
RICHARD E. FAYLING
BY
Carpenter, Kinney & Coulter
ATTORNEYS United States Patent Office 3,492,532
Patented Jan. 27, 1970

3,492,532
OVERVOLTAGE PROTECTION DEVICE
Richard E. Fayling, White Bear Lake, Minn., assignor to Minnesota Mining and Manufacturing, St. Paul, Minn., a corporation of Delaware
Filed Nov. 17, 1967, Ser. No. 683,930
Int. Cl. H02h 3/00, 5/00, 7/00
U.S. Cl. 317—16                                 9 Claims

ABSTRACT OF THE DISCLOSURE

A circuit overvoltage protecting device utilizing a gaseous discharge of an ionizable gas within a sealed tube to activate an electromagnetic switching device including two electrodes spaced a distance apart and a magnetic, conductive fluid cradled in a surface of one electrode is disclosed. The electromagnetic device further includes a means for using the current produced by the gaseous discharge in response to an overload voltage to produce a magnetic field between the electrodes which will displace the magnetic fluid to a position linking both electrodes to close a bypass circuit preventing the overvoltage from reaching the circuit being protected.

---

Certain known circuit protection devices or circuit breaking devices which are used to limit the magnitude of transient overvoltages on equipment are "single shot" units. These units operate to protect the circuit when a certain voltage limit is exceeded. In some instances, after operation replacement of the device is required. As an example, telephone systems utilize a protective device to prevent excess voltage inadvertently appearing on the telephone line from reaching the telephone receiver. Injury to both person and equipment is thereby prevented. Presently, the protection systems for this purpose comprise a carbon block placed between each telephone line pair and a ground line. When an overvoltage condition occurs on the telephone line, a spark discharge or arc occurs between the blocks. If the overvoltage is excessive, the spark discharge causes the carbon blocks to become fused causing a short circuit whereby the telephone line acts as a fuse and melts resulting in an open circuit. Obviously, an open-circuited line and shorted protective device put the telephone out of operation until the protection unit and line are replaced by a service man.

The present invention provides a load protection device which prevents an overload voltage from damaging a load such as, for example, a circuit. After the overload condition has subsided, the device automatically restores the protected circuit to a normal operating condition. The protection device remains operable after being subjected to the overload and does not have to be replaced.

Certain types of circuit breakers may utilize a mechanical relay activated by a predetermined voltage level. In certain applications, the switching times of relays are too slow to prevent the circuit from being damaged by an overvoltage such as, for example, lighting strokes. The device of the present invention overcomes these difficulties by initially discharging the overvoltage by a high speed gas discharge-type switch between a pair of electrodes which electrodes are subsequently electrically connected by a conductive magnetic material.

In certain applications, semiconductor devices are utilized to prevent an overvoltage from damaging a circuit. Such devices, however, are limited in their current-carrying capabilities. Those semiconductor devices which are capable of handling high current densities require elaborate heat sinking arrangements which increase both cost and size. The overvoltage protection device of the present invention utilizes in combination with the ionizable gas a rugged electromagnetic device which can easily carry the high currents produced during overload conditions.

One object of this invention is to provide an electrical control device combining an ionizable gas capable of being discharged by an overvoltage and an electromagnetic device which is responsive to the ionization of the gas to prevent the overvoltage from reaching a load.

Another object of this invention is to provide an overvoltage protection device utilizing a magnetic, conductive liquid to effect operation of an electromagnetic switching device.

Still another object is to provide a circuit protection device which will ensure the necessary protection to a circuit when subjected to an overvoltage condition and which automatically restores the protected circuit to a normal operating condition after the overvoltage condition subsides.

A further object is to provide a small, dependable and relatively inexpensive device capable of repeated use after being subjected to an overvoltage condition.

An additional object of the invention is to produce a high speed overvoltage device capable of handling large currents.

These and other objects of the invention will become more apparent after studying the following detailed description when considered in light of the accompanying drawing wherein:

FIGURE 1 is a schematic diagram illustrating a typical electrical connection between a load to be protected from an overvoltage and a protective device of the present invention;

FIGURE 2A is a diagrammatic illustration partially in cross-section of one embodiment of an overvoltage device wherein a magnetic, conductive liquid of an electromagnetic switching device is shown in an open-circuit position between electrodes having a spacing which permits the fluid to be located therebetween;

FIGURE 2B is identical to FIGURE 2A except that the magnetic, conductive liquid of the electromagnetic switching device is shown in a closed-circuit position and the relationship between liquid and electrodes is shown in a partial section;

FIGURE 3 is a diagrammatic representation of another embodiment of an overvoltage protection device wherein the electrodes are designed to maintain the liquid out of the interelectrode spacing when the electromagnetic switching device is in the open-circuit state; and FIGURE 4 is an illustration of yet another embodiment utilizing different electrode shapes and spacing.

Briefly, this invention discloses an overvoltage device comprising means for enclosing in a sealed chamber comprising other than a magnetically-permeable material at least one pair of electrodes positioned in a predetermined spacial relationship. An ionizable gas is contained within the chamber and the gas is capable of producing a gaseous discharge between the electrodes when an overvoltage appears thereacross. After discharge, the gas is capable of sustaining an ionizable current flow between the electrodes. A magnetic conductive material is positioned adjacent the pair of electrodes. This material is capable of being displaced from an open-circuit position to a closed-circuit position bridging the at least one pair of electrodes in response to a magnetic field whose flux links the at least one pair of electrodes. The device also includes means electrically connected in series with one electrode for producing a magnetic field of a magnitude and direction in response to the ionization current produced by an overvoltage discharging the ionizable gas to displace the material across the at least one pair of electrodes until the overvoltage subsides.

FIGURE 1 illustrates a schematic diagram illustrating a typical wiring connection of an overload protection device, generally designated 10, to a load, such as for example a circuit 12, which is to be protected. The device 10 is connected by conductors 14 and 16 between the power line $L_1$ and the ground line $L_g$ supplying the circuit 12. Excessive voltages, or overvoltages exceeding a selected voltage, appearing between line $L_1$ and line $L_g$ automatically cause the overvoltage protection device 10 to produce a low resistance path between line $L_1$ and ground line $L_g$ to protect the circuit 12 from the overvoltage.

FIGURE 2A illustrates one embodiment of an overvoltage protection device 10 incorporating the teachings of the present invention. The device 10 includes a sealed chamber or tube 18 composed of a relatively rigid envelope 22 comprising a magnetically-impermeable material such as, for example, a light transmitting material, such as glass. Two electrodes 24 and 26 are mounted within the envelope 22 and are spaced a predetermined distance apart to form an ionization gap 28 therebetween. The electrodes 24 and 26 are connected to conductors 30 and 34 respectively, which sealingly project through the opposite ends of the envelope 22. The envelope 22 is filled with an ionizable gas, such as, for example, an inert gas which may be argon, neon or crypton. The pressure of the gas and the shape and spacing of the electrodes 24 and 26 are selected to produce a gas discharge between electrodes 24 and 26 whenever a certain voltage occurs.

In the preferred embodiment, the electrode 24 is formed with a concave inner end surface 40 which cradles and accommodates a quantity of magnetic conductive material which will not wet the envelope 22. FIGURE 2A, partially in cross-section, illustrates the relationship between electrode 24 and the magnetic conductive material, such as, for example, a liquid 42. The material preferably is a liquid 42 comprising a suspension of fine iron particles in mercury. The magnetic conductive liquid is deformable or displaceable by a magnetic field whereby the liquid 42 can be selectively displaced from an open-circuit position shown in FIGURE 2A to a closed-circuit position shown in FIGURE 2B. When the liquid 42 is in the closed-circuit position, the electrodes 24 and 26 are electrically connected and a current is capable of flowing therebetween.

The electrode 26 has a conical inner end portion 44 with a tip or terminal end thereof directed toward and spaced a distance from the concave surface 40 and the surface of the liquid 42 when the liquid 42 is in the open-circuit position. The electrodes 24 and 26 are preferably composed of electrically-conductive, magnetically-permeable material, such as soft iron, having low magnetic retentivity. The conical tip 44 on the electrode 26 serves to concentrate thereat the flux of any magnetic field established between the electrodes 24 and 26.

The electrode 26 is electrically connected via conductor 34 and a lead 46 to a magnetic field producing means 48. In the preferred embodiment shown in FIGURES 2A and 2B, the magnetic field is produced by the magnetic field producing means or coil 48 which is conical in shape having an opening therein in which the envelope 22 is inserted. The coil 48 is positioned such that a magnetic flux produced by the magnetic field in response to the current flowing therethrough links electrodes 24 and 26. The coil 48 has a second lead 50 which is connected via a resistor 52 to conductor 14. Resistor 52 serves to limit the amount of current passing through the coil 48. The other conductor 16 is electrically connected to conductor 30 thereby electrically connecting the overvoltage device across input leads $L_1$ and $L_g$.

The actual operation of the overvoltage protection device 10 will now be described. When the voltage across lines $L_1$ and $L_g$ reaches an overvoltage level requiring protection of the circuit 12, the ionizable gas within the envelope 22 becomes ionized and a discharge occurs which produces an ionized current flow between electrodes 24 and 26. This current passes along the path determined by conductor 14, resistor 52, lead 50, coil 48, lead 46, conductor 34, electrode 26, the ionized gas, electrode 24 and conductors 30 and 16. This current flow produces a magnetic field whose flux links electrodes 24 and 26. The magnetic gradient produced between electrodes 24 and 26 produces a force on the liquid 42. The liquid 42 is displaced from its open-circuit position (FIGURE 2A) to its closed-circuit position (FIGURE 2B) bridging and electrically connecting electrodes 24 and 26. The conducting path thereby produced between electrodes 24 and 26 reduces the voltage therebetween to substantially zero which extinguishes the gas discharge. The liquid 42 in physical contact with electrodes 24 and 26 essentially provides a low resistance shunt to ground to isolate circuit 12 from the overvoltage.

As the overvoltage gradually decreases, the current flowing through coil 48 and electrodes 24 and 26 is reduced. This gradual decrease in current gradually reduces the strength of the magnetic field until a point is reached wherein the force of gravity exceeds the magnetic force exerted on the liquid 42. When this occurs, the liquid 42 returns to an open-circuit position. In some applications, it may be necessary to momentarily reduce the normal circuit voltage to a lower voltage value to obtain an open circuit condition. The circuit 12 is thereby restored to its normal operating condition and the device 10 is again ready to protect against another overvoltage.

A preferred embodiment of the present device may be used in an environment to protect electrical equipment, such as a telephone line or computer transmission line, from voltage surges. The envelope 22 may be filled with an inert gas, such as neon, to a pressure of about 35 mm. of mercury. The distance between the tip of electrode 24 and the surface of liquid 42 is set to about 0.040 inch (approximately 1 mm.). Such a combination of gas, pressure and spacing provides a device which will discharge when the voltage exceeds approximately 250 volts. The resistor 52 may have a value of approximately 130,000 ohms depending on the value necessary to protect the electrodes 24 and 26. The coil 48 may have between 1,500 and 10,000 turns of #16 wire wrapped around a core comprising a steel stamp sheet of the type used in standard power transformers. The number of turns in the coil is dependent upon the strength of the applied magnetic field necessary to produce a gradient between electrodes 24 and 26 to displace the liquid 42 into electrical connection with the electrodes 24 and 26. This force, measured in oersteds, depends upon the parameters of the switching device including the gap between electrodes 24 and 26.

FIGURE 3 is a perspective drawing of another embodiment wherein a different electrode arrangement is utilized. A conductive magnetic liquid 58 is cradled in a deep concave section 60 carved within electrode 62. In this embodiment, the electrode 62 is designed such that an extended periphery or pronounced outer edge 68 is spaced from the tip 64 of electrode 66. This electrode structure insures that ionization of the gas occurs between the conical tip 64 and the outer edge 68 at substantially the same voltage every time an overvoltage occurs.

FIGURE 4 illustrates yet another embodiment including an alternate means for producing a magnetic field. In this embodiment, both of the ends or tips of both electrodes 70 and 72 are tapered and extend into the interior of a sealed chamber 74. The electrodes are axially aligned in a spaced relationship within the chamber 74 in a horizontal position. A magnetic conductive fluid 76 rests at the bottom of the chamber 74 and is capable of being moved by a magnetic field into a closed-circuit position physically and electrically connecting electrodes 70 and 72.

An alternate means for producing a magnetic field may comprise, for example, a U-shaped magnetically-permeable metal core 80 partially wrapped by a conductor 82. The core 80 is preferably formed of a metal having a relatively low magnetic retentivity, such as soft iron. One end of the conductor 82 is connected (illustrated diagrammatically) to electrode 70. The other end of conductor 82 is connected to one end of current limiting resistor 86. The magnetic field is produced in the core 80 by current flowing through conductor 82. The current is initially supplied by the gas discharge in the manner previously described. The wrapped core 80 is positioned relative to the chamber 74 such that the magnetic flux produced by the magnetic field links electrodes 70 and 72.

Having thus described the present invention with respect to preferred and alternative embodiments thereof, it is to be understood that other alternative arrangements based on this fundamental principle may be utilized, such as providing devices of various parameters including gas pressure, gap between the electrodes and the number of turns in the coil windings to produce magnetic fields of different flux density.

What is claimed is:

1. An overvoltage protecting device comprising
   means for enclosing in a sealed chamber formed of a magnetically-impermeable material at least one pair of electrically - conductive magnetically - permeable electrodes positioned in a predetermined spacial arrangement, said electrodes having external leads across which said voltage can be applied;
   an ionizable gas contained within said chamber, said gas being capable of producing a gaseous discharge between said at least one pair of electrodes when said overvoltage occurs thereacross, and being capable of sustaining an ionization current flow therebetween from said overvoltage;
   a magnetic conductive material positioned adjacent said at least one pair of electrodes and capable of being displaced from an open-circuit position to a closed-circuit position bridging said at least one pair of electrodes in response to a magnetic field whose flux links said at least one pair of electrodes; and
   means electrically connected in series with one electrode for producing a magnetic field in response to said ionization current produced by an overvoltage discharging said ionizable gas of a magnitude and direction to displace said material to said closed-circuit position across said at least one pair of electrodes until said overvoltage subsides.

2. The device of claim 1 wherein said means for producing said magnetic field comprises
   a coil wrapped around said sealed chamber and so positioned relative to said at least one pair of electrodes that magnetic flux of the magnetic field produced by current flowing in said coil links said at least one pair of electrodes, said coil comprising an electrical conductor having one end connected to one electrode of said at least one pair of electrodes.

3. The device of claim 1 wherein said means for producing said magnetic field comprises
   an electromagnet located adjacent said sealed chamber, said electromagnet including a U-shaped magnetically-permeable metal core and a length of conductor wrapped around said core, said conductor having one end connected to one electrode of said at least one pair of electrodes, said electromagnet being so positioned relative to said at least one pair of electrodes that magnetic flux of the magnetic field produced across the arms of said U-shaped core by current flowing in said conductor links said at least one pair of electrodes.

4. The device of claim 1 wherein the electrode arrangement comprises
   a first electrode located within said sealed chamber, said electrode having a conical end portion directed toward the interior of said sealed chamber; and
   a second electrode located within said sealed chamber having an inner end directed toward the interior of said chamber and spaced a predetermined distance from and in alignment with said conical end portion of said first electrode, said inner end having a recessed, concave section capable of cradling said magnetic conductive material in the absence of an overvoltage.

5. The device of claim 1 wherein the electrode arrangement comprises
   a pair of elongated electrodes coaxially aligned relative to each other within said sealed chamber so oriented that the said pair of electrodes are in a horizontal position, each of said electrodes having a conical end portion directed toward the interior of said chamber and spaced a predetermined distance from the said conical end portion of the other electrode and wherein said magnetic conductive material is located adjacent said conical end portion in said chamber, said electrodes being capable of being electrically connected by said magnetic conductive material located between said electrodes at the bottom of said chamber when said producing means produces a flux which urges said magnetic conductive material into physical contact with each of said conical end portions.

6. The apparatus of claim 2 wherein said sealed chamber is a relatively thin elongated cylinder constructed of a glass and wherein said coil is cylindrically-shaped having a central opening therein into which said sealed chamber is inserted.

7. The apparatus of claim 4 wherein said second electrode concave section has sufficient depth to cradle said magnetic conductive material below an extended periphery of said concave section, said concave section periphery being capable of cooperating with said conical end portion of said first electrode to sustain a gaseous discharge therebetween in the presence of an overvoltage until said magnetic conductive material begins to bridge the gap therebetween.

8. The apparatus of claim 6 wherein said magnetic conductive material is mercury having magnetic conductive particles suspended therein.

9. The apparatus of claim 8 wherein said ionizable gas is an inert gas.

References Cited

UNITED STATES PATENTS

| | | | |
|---|---|---|---|
| 2,564,081 | 8/1951 | Schilling | 335—56 |
| 3,353,066 | 11/1967 | De Souza | 317—16 X |
| 3,405,300 | 10/1968 | Wasa et al. | 315—344 X |
| 3,435,287 | 3/1969 | Jacobsen | 317—73 X |

LEE T. HIX, Primary Examiner

J. D. TRAMMELL, Assistant Examiner

U.S. Cl. X.R.

313—172; 315—340, 344; 317—22, 31, 73; 335—56